United States Patent
Sasaki (10) Patent No.: US 9,934,470 B2
(45) Date of Patent: Apr. 3, 2018

(54) PRODUCTION EQUIPMENT INCLUDING MACHINE LEARNING SYSTEM AND ASSEMBLY AND TEST UNIT

(71) Applicant: FANUC CORPORATION, Yamanashi (JP)

(72) Inventor: Taku Sasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/281,032

(22) Filed: Sep. 29, 2016

(65) Prior Publication Data
US 2017/0091675 A1 Mar. 30, 2017

(30) Foreign Application Priority Data
Sep. 30, 2015 (JP) .................. 2015-193852

(51) Int. Cl.
G06N 99/00 (2010.01)
G06F 17/10 (2006.01)
(Continued)

(52) U.S. Cl.
CPC .......... *G06N 99/005* (2013.01); *G06F 17/16* (2013.01); *G06N 3/0427* (2013.01); *G06N 5/045* (2013.01)

(58) Field of Classification Search
None
See application file for complete search history.

(56) References Cited

U.S. PATENT DOCUMENTS

2006/0106477 A1 5/2006 Miyashita
2007/0219738 A1 9/2007 Weiher et al.
2007/0288419 A1 12/2007 Strassner

FOREIGN PATENT DOCUMENTS

CN 102016730 A 4/2011
CN 102449623 A 5/2012
(Continued)

OTHER PUBLICATIONS

Mahadevan, Sridhar, and Georgios Theocharous. "Optimizing Production Manufacturing Using Reinforcement Learning." FLAIRS Conference. 1998.*
(Continued)

*Primary Examiner* — Kakali Chaki
*Assistant Examiner* — Eric Nilsson
(74) *Attorney, Agent, or Firm* — Hauptman Ham, LLP (57) ABSTRACT

Production equipment according to an embodiment of the present invention includes a machine learning system and an assembly and test unit. The assembly and test unit chooses components from component groups having different characteristic values, assembles the chosen components into a product, and tests the assembled product. The machine learning system includes a state observer for observing a test result of the product and the inventory amounts of the components grouped based on the characteristic values of the components; a reward calculator for calculating a reward based on the test result and the inventory amounts; an artificial intelligence for determining an action value based on an observation result by the state observer and the reward calculated by the reward calculator; and a decision maker for choosing components to be used in the next product assembly from the component groups based on a determination result by the artificial intelligence.

5 Claims, 4 Drawing Sheets

(51) Int. Cl.
  *G06F 17/16*   (2006.01)
  *G06N 5/04*    (2006.01)
  *G06N 3/04*    (2006.01)

(56) References Cited

FOREIGN PATENT DOCUMENTS

| CN | 103295065 A | 9/2013 |
|----|-------------|--------|
| DE | 19828528 A1 | 12/1998 |
| DE | 102012216574 A1 | 3/2014 |
| JP | 1-244989 A | 9/1989 |
| JP | 2003-324909 A | 11/2003 |
| JP | 2004-94900 A | 3/2004 |

OTHER PUBLICATIONS

Izquierdo, L. Eduardo, et al. "Feedforward control of multistage assembly processes using programmable tooling." Trans. NAMRI/SME 35 (2007): 295-302.*

Jayaram, K., et al. "A Neural Network Approach to Tolerance Synthesis and Cost Optimization in Assembly." i-Manager's Journal on Future Engineering and Technology 5.2 (2009): 9.*

Chung, Dae-Woong, and Seung-Ki Sul. "Analysis and compensation of current measurement error in vector-controlled AC motor drives." IEEE Transactions on industry applications 34.2 (1998): 340-345.*

* cited by examiner

PRODUCTION EQUIPMENT INCLUDING MACHINE LEARNING SYSTEM AND ASSEMBLY AND TEST UNIT

This application is a new U.S. patent application that claims benefit of JP 2015-193852 filed on Sep. 30, 2015, the content of 2015-193852 is incorporated herein by reference.

BACKGROUND OF THE INVENTION

1. Field of the Invention

The present invention relates to production equipment including a machine learning system and an assembly and test unit, and in particular relates to production equipment including a machine learning system and an assembly and test unit that has the function of producing products, such that the performance of the product assembled from a plurality of components is close to a target level and the difference in inventory amounts among the components grouped based on their characteristic values is reduced.

2. Description of Related Art

Motor assembly equipment that enables the low-cost mass production of motors with high productivity and high quality stability by automating most of an assembly process is known (for example, Japanese Unexamined Patent Publication (Kokai) No. 2003-324909).

In conventional assembly equipment for motors, motor drives, and the like, a choice of a plurality of components itself is made manually. Since the plurality of components individually have errors in their characteristics, the characteristics of a product depend on the errors of the plurality of components. Thus, if components that are chosen at random are assembled into a product, the assembled product has a characteristic value i.e. the sum of characteristic values of the components. Moreover, manually choosing the components requires significant time and effort.

SUMMARY OF THE INVENTION

The present invention aims at providing production equipment that produces products having less variation in their circuit characteristics without requiring man-hours.

Production equipment according to an embodiment of the present invention includes a machine learning system and an assembly and test unit. The assembly and test unit chooses a plurality of components from a plurality of component groups having different characteristic values, assembles the chosen plurality of components into a product, and tests the assembled product. The machine learning system includes a state observer for observing a test result of the product and the inventory amounts of the plurality of components grouped based on the characteristic values of the components; a reward calculator for calculating a reward based on the test result and the inventory amounts; an artificial intelligence for determining an action value based on an observation result by the state observer and the reward calculated by the reward calculator; and a decision maker for choosing a plurality of components to be used in the next product assembly from the plurality of component groups based on a determination result by the artificial intelligence.

BRIEF DESCRIPTION OF THE DRAWINGS

The objects, features, and advantages of the present invention will be more apparent from the following description of an embodiment in conjunction with the attached drawings, wherein.

DETAILED DESCRIPTION OF THE INVENTION

Production equipment according to the present invention will be described below with reference to the drawings.

Figure 1:
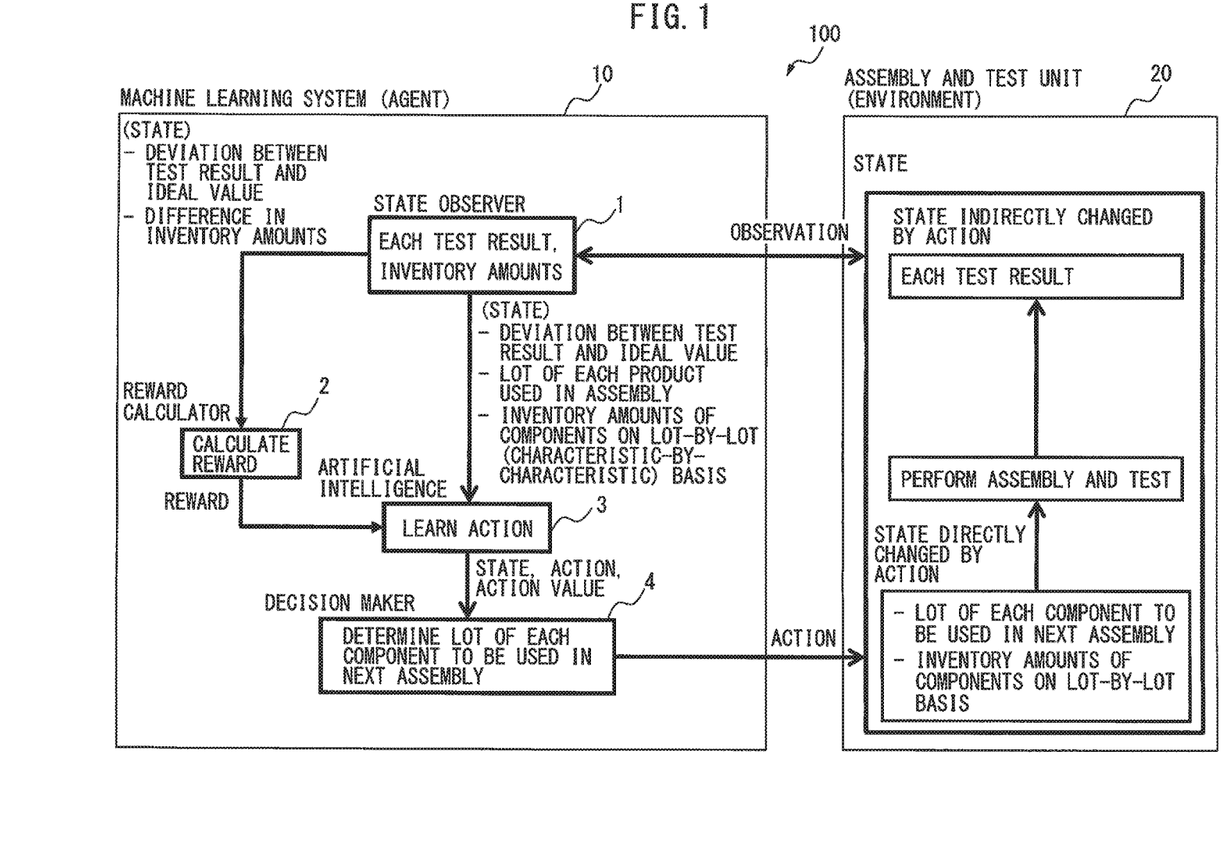
FIG. 1 is a block diagram of production equipment according to an embodiment of the present invention.

FIG. 1 is a block diagram of production equipment according to an embodiment of the present invention. Production equipment 100 according to an embodiment of the present invention includes a machine learning system 10 and an assembly and test unit 20. The machine learning system 10 includes a state observer 1, a reward calculator 2, an artificial intelligence (hereinafter also called "learning unit") 3, and a decision maker 4.

Figure 2:
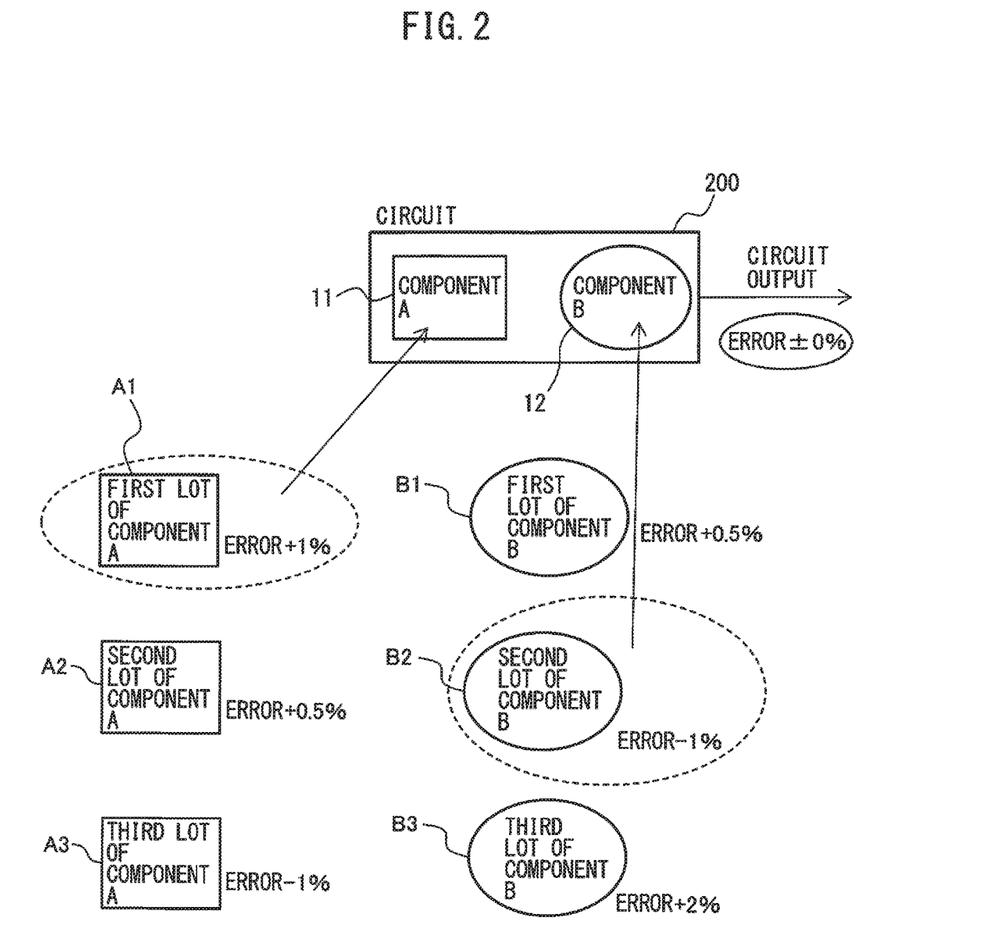
FIG. 2 is a conceptual diagram of a process for producing a circuit using the production equipment according to the embodiment of the present invention from a plurality of components chosen from a plurality of component groups.

FIG. 2 is a conceptual diagram of a process for producing a circuit from a plurality of components chosen from a plurality of component groups using the production equipment according to the embodiment of the present invention. The assembly and test unit 20 chooses a plurality of components (11 and 12) from a plurality of component groups (A1, A2, A3, B1, B2, and B3) having different characteristic values, assembles the chosen plurality of components (11 and 12) into a product 200, and tests the assembled product 200.

The characteristic of the component is, for example, an error in resistance or the like of the component, but is not limited to this. For example, the characteristic of the component may be an electrical characteristic such as voltage, or mechanical characteristics such as dimensions.

In FIG. 2, a component A (11) is chosen from three lots, i.e., first to third lots A1 to A3 of components A. In a similar manner, a component B (12) is chosen from three lots, i.e., first to third lots B1 to B3 of components B. However, the number of lots is not limited thereto, but may be two, four, or more.

Each lot contains a plurality of components having substantially equal characteristic values. For example, the first lot A1 contains 1000 components A having errors of approximately +1% with respect to a reference characteristic value of the components A. The second lot A2 contains 1000 components A having errors of approximately +0.5% with respect to the reference characteristic value of the components A. Likewise, for example, the first lot B1 contains 700 components B having errors of approximately +0.5% with respect to a reference characteristic value of the components B. The second lot B2 contains 700 components B having errors of approximately −1% with respect to the reference characteristic value of the components B. However, the types of components, the numbers of lots, the number of components contained in each lot, the characteristic values of the components that each lot contains, and the like described above are simply examples, and are not limited thereto.

As shown in FIG. 2, for example, the production equipment 100 chooses the single component A (11) from the first lot A1 of the components A and the single component B (12) from the second lot B2 of the components B, and produces the product (circuit) 200 therefrom. At this time, assuming that the plurality of components A contained in the first lot A1 have an error of +1% in their characteristic and the plurality of components B contained in the second lot B2 have an error of −1% in their characteristic, the product 200 has an error of ±0% in circuit output, i.e., in its performance with respect to a target level.

In a circuit constituted of several tens to several hundreds of components, in general, the sum of errors of the components manifests itself as an error in circuit output. When components that have different errors from lot to lot are assembled into products, each of the products desirably has an error in circuit output as close to ±0% as possible. On the other hand, it is desirable to prevent a lot having a large error from not being used.

Therefore, the production equipment according to the embodiment of the present invention learns to use components so as to bring an error in circuit output close to ±0%, while preventing a lot having a large error from being left as inventory. At the beginning, the machine learning system 10 does not know the error of each lot of each type of components. However, the machine learning system 10 learns the errors of individual lots while measuring the circuit outputs of assembled products. To bring an error in circuit output close to ±0%, lots having small errors tend to be preferentially used. However, leaving a lot having a large error as inventory provides a low reward, for the purpose of reducing the difference in inventory amounts among components grouped based on their characteristic values.

The state observer 1 observes test results of products 200 and the inventory amounts of components grouped into a plurality of component groups (A1, A2, A3, B1, B2, and B3) based on the characteristic values of the components. As an example of the test results of the products 200, when one component is chosen as a component A (11) from the first lot A1 (having an error of +1%) i.e. a component group of the components A, and one component is chosen as a component B (12) from the first lot B1 (having an error of +0.5%) i.e. a component group of the components B, a product 200 has an error of the order of 1.5% in its performance. Also, as an example of the inventory amounts of the components grouped based on the characteristic values thereof, assuming that the first lot A1 contains 1000 components A at the beginning, the inventory amount of the components having an error of +1% in their characteristic values is 900, after the use of 100 components.

The reward calculator 2 calculates a reward based on the test result and the inventory amounts. A method for calculating the reward will be described later on.

The artificial intelligence (learning unit) 3 determines an action value based on an observation result by the state observer 1 and the reward from the reward calculator 2. A method for determining the action value will be described later on.

The decision maker 4 chooses a plurality of components (components A and B) to be used in the next product assembly from the plurality of component groups (A1, A2, A3, B1, B2, and B3) based on a determination result by the artificial intelligence 3.

Next, the method for calculating the reward will be described. By way of example, the reward calculator 2 may calculate a higher reward, as the performance of a product 200, i.e., a test result is closer to a target level. The reward calculator 2 may calculate a lower reward, as the difference in inventory amounts of components grouped based on the characteristic values of the components is increased. For example, when a test result is equal to a target level, an error is ±0%. At this time, when an obtained product has an error of +0.5%, a higher reward is provided as compared with the case of having an error of +1%. Also, when an obtained product has an error exceeding a predetermined level (for example, 2%), a negative reward may be provided. On the other hand, as to the inventory amounts, when the difference in inventory amounts among a first lot A1, a second lot A2, and a third lot A3 of components A, i.e., the difference between a maximum number and a minimum number of the inventory amounts of the lots of the components is 20, a lower reward is provided as compared with the case of having a difference of 10. Note that, the characteristic of the product may be an electrical characteristic such as voltage, or a mechanical characteristic such as dimensions.

Figure 4:
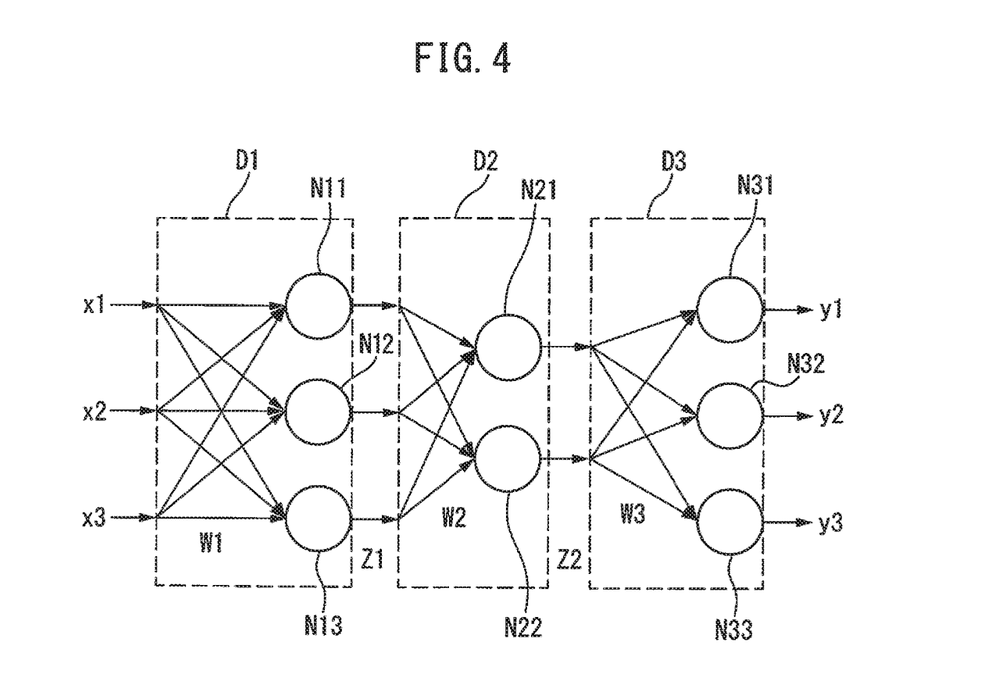
FIG. 4 is a schematic diagram of a three-layer neural network model.

The artificial intelligence 3 preferably performs a computation of a state variable observed by the state observer 1 in a multilayer structure, and updates an action value table for determining an action value in real time. As a method for performing the computation of the state variable in the multilayer structure, for example, a multilayer neural network, as shown in FIG. 4, is usable.

Here, the machine learning system 10 as shown in FIG. 1 will be described in detail. The machine learning system 10 has the function of learning knowledge, as well as the functions of extracting useful rules, knowledge representations, criteria, and the like from a data group inputted to the machine learning system 10 by analysis and outputting a determination result. There are various methods therefor, which are broadly divided into "supervised learning", "unsupervised learning", and "reinforcement learning". Moreover, when realizing these methods, a method called "deep learning" that learns the extraction of features is used.

In the "supervised learning", a large amount of data pairs of a certain input and a result (label) are provided to a learning system. The learning system learns features from the data set, and heuristically obtains a model to predict a result from an input, i.e., the relationship therebetween. In this embodiment, the supervised learning can be used for predicting the lot of each component to be used in the next product assembly based on an observation result by the state observer, which includes a test result of a product and the difference in inventory amounts of the components grouped based on their characteristic values, and a reward calculated by the reward calculator. This can be realized using an algorithm such as a neural network described later.

In the "unsupervised learning", only a large amount of input data is provided to the learning system. The learning system learns the distribution of the input data and applies compression, classification, alignment, or the like to the input data, without being applied with corresponding output data as supervisors. The features of the data set can be subjected to clustering by analogy. With the use of this result, while providing a certain criterion, an output is assigned so as to optimize the criterion, and this allows a prediction of the output. There is also a method called "semi-supervised learning" as an intermediate problem setting between the "supervised learning" and the "unsupervised learning", in which a part of data includes pairs of an input and an output while the other includes only inputs. In this embodiment, the unsupervised learning uses data that can be obtained without actually operating the assembly and test unit, in order to improve learning efficiency.

Problems with reinforcement learning are determined as follows.

The assembly and test unit observes an environment state and determines an action.

An environment varies in accordance with some rule, and besides, an own action sometimes varies the environment.

A reward signal returns whenever an action is performed. The aim is to maximize a total (discounted) reward in the future.

The learning is started from a state in which a result brought about by an action is never or insufficiently known. The assembly and test unit can obtain the result as data, only after the assembly and test unit is actually operated. In other words, it is necessary to search for an optimal action through trial and error.

The learning may be started from a favorable start point by performing prior learning (using a method of the above-described supervised learning or inverse reinforcement learning) so as to mimic the action of a human in an initial state.

The "reinforcement learning" is a method for learning a sequence of optimal actions by learning, as well as determining and classifying, actions based on the interactions between the action and an environment, in other words, a learning method to maximize a total reward obtained in the future. In this embodiment, this indicates that a sequence of actions having an effect on the future can be obtained. The following description takes Q learning as an example, but is not limited thereto.

The Q learning is a method for learning a $Q(s, a)$ value for choosing an action "a" in a certain environment state "s". In other words, in a certain state "s", an action "a" having the highest $Q(s, a)$ value is chosen as an optimal action. However, a correct $Q(s, a)$ value as to a combination of a state "s" and an action "a" is not known at all at the beginning. Thus, an agent chooses various actions "a" in a certain state "s", and executing each action "a" in the state "s" provides the agent with a reward. Therefore, the agent learns to choose a better action, i.e., a correct $Q(s, a)$ value.

The aim is to maximize a total reward to be obtained in the future, as a result of choosing a sequence of actions. Thus, the agent eventually aims at $Q(s, a) = E[\Sigma \gamma^t r_t]$ (an expected value of a total discounted reward: $\gamma$ is a discount factor) (the expected value is taken when the agent moves from state to state by performing a sequence of optimal actions. The sequence of optimal actions has not been known as a matter of course, and hence has to be found while learning.). For example, an update equation for a $Q(s, a)$ value is represented as follows:

$$Q(s_t, a_t) \leftarrow Q(s_t, a_t) + \alpha\left(r_{t+1} + \gamma \max_a Q(s_{t+1}, a) - Q(s_t, a_t)\right)$$

where $s_t$ represents an environment state at a time t, and $a_t$ represents an action at the time L. By executing the action $a_t$, the agent moves to a state $s_{t+1}$. The state change provides the agent with a reward $r_{t+1}$. A term with "max" represents the product of a Q value, when an action "a" having the highest Q value that has been known at that time is chosen in the state $s_{t+1}$, and $\gamma$. "$\gamma$" is a parameter in the range of $0<\gamma\leq1$ and is called discount factor. "$\alpha$" is a learning rate in the range of $0<\alpha\leq1$.

This equation indicates a method for updating a $Q(s_t, a_t)$ value of an action $a_t$ in a state $s_t$ based on a reward $r_{t+1}$ that has returned as a result of the action $a_t$. This update equation indicates that, as compared with a $Q(s_t, a_t)$ value of an action "a" in a state "s", if a $Q(s_{t+1}, \max a_{t+1})$ value of an optimal action "max a" in the next state derived from a reward $r_{t+1}$ plus the action "a" is higher, $Q(s_t, a_t)$ is increased. If not, $Q(s_t, a_t)$ is decreased. In other words, the value of an action in a certain state is approximated to an optimal action value in the next state i.e. derived from a reward returning as a result of the action and the action itself.

There are two methods for representing $Q(s, a)$ values in a computer, i.e., a method in which Q values of all state-action pairs (s, a) are retained in a table (action value table) and a method in which a function for approximating $Q(s, a)$ values is prepared. In a latter method, the above-described update equation can be realized by adjusting a parameter for an approximation function using a stochastic gradient descent method or the like. As the approximation function, a neural network is usable as described later.

Figure 3:
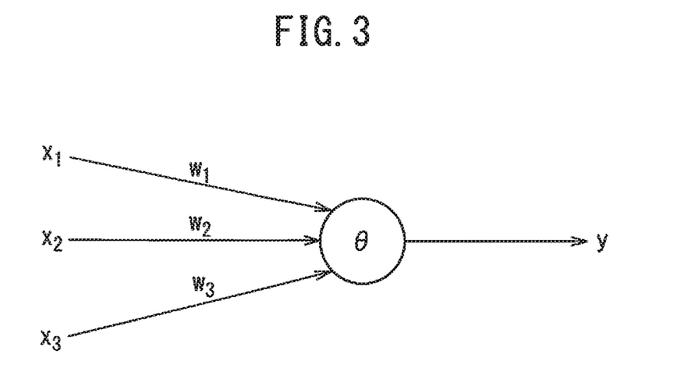
FIG. 3 is a schematic diagram of a model of a neuron.

As an approximation algorithm for a value function in the supervised learning, the unsupervised learning, and the reinforcement learning, a neural network is usable. The neural network is composed of, for example, an arithmetic unit, memory, and the like that imitate a model of a neuron as shown in FIG. 3. FIG. 3 is a schematic view of a model of a neuron.

As shown in FIG. 3, a neuron produces an output y in response to a plurality of inputs x (for example, inputs $x_1$ to $x_3$). To each of the inputs $x_1$ to $x_3$, a weight w ($w_1$ to $w_3$) corresponding to the input x is applied. Thus, the neuron produces the output v represented by the following equation. Note that, the input x, the output y, and the weight w are all in the form of a vector.

$$y = f_k(\Sigma_{i=1}^n x_i w_i - \theta)$$

where $\theta$ is a bias, and $f_k$ is an activation function.

Next, a three-layer neural network into which the above-described neurons are combined will be described with reference to FIG. 4. FIG. 4 is a schematic view of a neural network having weights of three layers D1 to D3.

As shown in FIG. 4, a plurality of inputs x (for example, inputs x1 to x3) are inputted from the left of the neural network, and a result y (for example, results y1 to y3) is outputted from the right thereof.

To be more specific, the inputs x1 to x3 are inputted to each of the three neurons N11 to N13 while being weighted correspondingly. The weights applied to the inputs are collectively indicated by W1.

The neurons N11 to N13 output vectors Z11 to Z13, respectively. The vectors Z11 to Z13 are collectively indicated by a feature vector Z1, which is regarded as a vector that extracts a feature amount from the input vector. The feature vector Z1 is in between the weight W1 and a weight W2.

The vectors Z11 to Z13 are inputted to each of two neurons N21 and N22 while being weighted correspondingly. The weights applied to the feature vectors are collectively indicated by W2.

The neurons N21 and N22 output vectors Z21 and Z22, respectively. The vectors Z21 and Z22 are collectively indicated by a feature vector Z2. The feature vector Z2 is between the weight W2 and a weight W3.

The feature vectors Z21 and Z22 are inputted to each of three neurons N31 to N33 while being weighted correspondingly. The weights applied to the feature vectors are collectively indicated by W3.

At last, the neurons N31 to N33 output the results y1 to y3, respectively.

The neural network has a learning mode and a value prediction mode. In the learning mode, the weight W is learned using a learning data set. In the value prediction mode, the action of the assembly and test unit is determined using the parameter obtained in the learning mode (the word of "prediction" is used for the sake of convenience, but various tasks including detection, classification, inference, and the like can be made).

The agent may immediately learn data that is obtained by actually operating the assembly and test unit in the prediction mode, and reflect the learning result in the next action (on-line learning). Also, the agent may collectively learn a data group collected in advance, and perform a detection mode thereafter using the parameter (batch learning). The agent may perform the learning mode whenever a certain amount of data is accumulated.

The weights W1 to W3 can be learned using an error back propagation algorithm (backpropagation algorithm). Information about an error enters from the right and propagates to the left. The error back propagation algorithm is a method in which the weights are adjusted (learned) with respect to each neuron so as to minimize the difference between an output y and an actual output y (supervisor) in response to an input x.

Such a neural network may have layers of more than three (called deep learning). An arithmetic unit that performs feature extraction from inputs in stages and regression of results can be automatically acquired from only supervisor data.

Accordingly, in order to perform the Q learning described above, as shown in FIG. 1, the machine learning system 10 according to this embodiment includes the state observer 1, the artificial intelligence 3, and the decision maker 4. However, a machine learning method applied to the present invention is not limited to the Q learning. For example, in the instance of applying the supervised learning, a value function corresponds to a learning model, and a reward corresponds to an error.

As shown in FIG. 1, the state of the assembly and test unit 20 includes a state indirectly changed by an action and a state directly changed by an action. The state indirectly changed by an action includes each test result. The state directly changed by an action includes the lot of each component to be used in the next product assembly and the inventory amounts of components on a lot-by-lot basis.

The artificial intelligence 3 updates the action value corresponding to the current state variable and the action to be taken in the action value table, based on the update equation and the reward.

The machine learning system 10 may be connected to the assembly and test unit 20 through a network, and the state observer 1 may acquire the current state variable through the network. The machine learning system 10 is preferably present in a cloud server.

The machine learning system 10 may be contained in the production equipment 100. In other words, the production equipment 100 may include the machine learning system 10 and the assembly and test unit 20.

In the example of FIG. 1, the own action value table is updated using the action value table updated by the artificial intelligence of the own machine learning system, but is not limited thereto. In other words, the own action value table may be updated using an action value table updated by an artificial intelligence of another machine learning system different from the own machine learning system.

Figure 5:
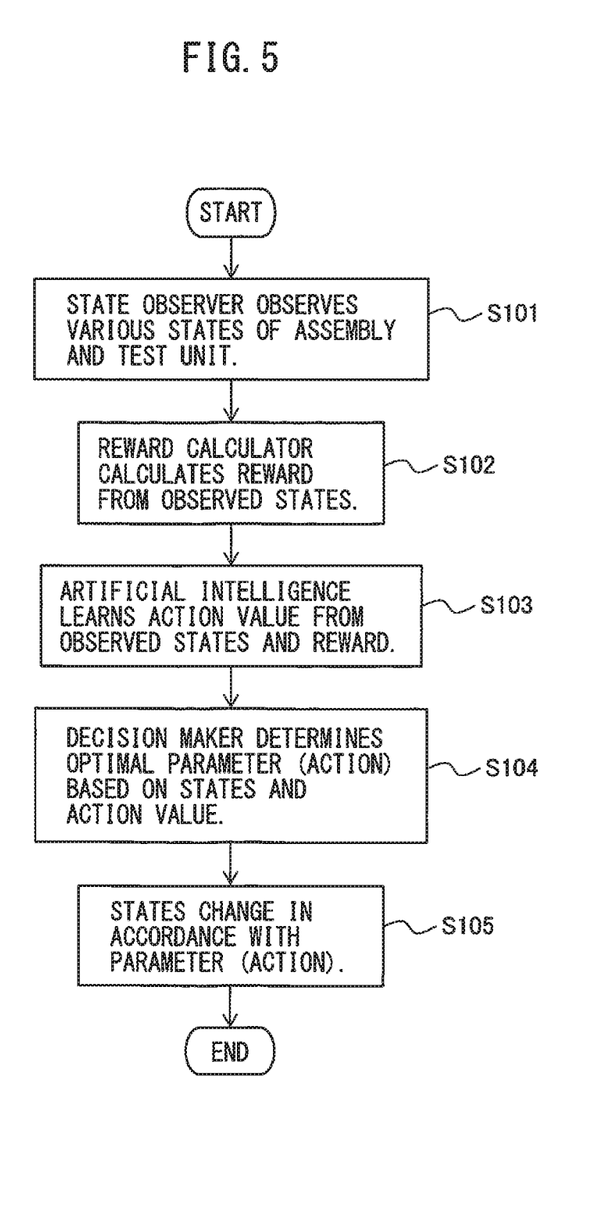
FIG. 5 is a flowchart of the operation process of the production equipment according to the embodiment of the present invention.

Next, the operation of the machine learning system included in the production equipment according to the embodiment of the present invention will be described. FIG. 5 is a flowchart of the operation process of the machine learning system according to the embodiment of the present invention.

First, in step S101, the state observer 1 observes the various states of the assembly and test unit 20. In other words, the state observer 1 observes a test result of a product produced by the assembly and test unit 20, and the inventory amounts of components grouped based on their characteristic values, after the production of the product.

Next, in step S102, the reward calculator 2 calculates a reward from the observed states. For example, the reward calculator 2 provides a higher reward as the performance of the product, which is obtained from the test result, is closer to the target level, and provides a lower reward as the difference in the inventory amounts among the components grouped based on their characteristic values is increased.

Next, in step S103, the artificial intelligence 3 learns an action value from the observed states and the reward.

Next, in step S104, the decision maker 4 determines an optimal parameter (action) based on the states and the action value. For example, the decision maker 4 determines a parameter (the lot of each component used in the next product assembly) to obtain a desired product performance and a desired difference in inventory amounts.

Next, in step S105, the states change in accordance with the parameter (action). In other words, the assembly and test unit 20 determines the lot of each component to be used in the next product assembly to obtain the desired product performance and the desired difference in inventory amounts.

At least part of products produced by the production equipment according to this embodiment may be motor drives. However, this is just an example, and the present invention is applicable to other products.

A plurality of components that the production equipment according to this embodiment uses in assembly of the product may include at least one of a current sensor and an A/D converter constituting a current detection circuit of the motor drive.

The characteristic of the components may include an offset voltage, and a test result may include an offset value of the current detection circuit of the motor drive.

As described above, according to the production equipment of the embodiment of the present invention, since a parameter for the assembly and test unit is automatically adjusted by machine learning with respect to a desired product performance and a desired difference in inventory amounts, it is possible to improve a product performance while reducing a difference in inventory amounts. As a result, it is possible to produce products having almost ideal circuit outputs (having an error of ±0%), while using components having large errors, thus preventing the components having large errors from being left as inventory.

According to the production equipment according to the embodiment of the present invention, it is possible to produce products having less variation in their circuit characteristics without requiring man-hours.

What is claimed is:

1. Production equipment, comprising:
a machine learning system; and
an assembly and test unit, wherein
the assembly and test unit chooses a plurality of components from a plurality of component groups having different characteristic values, assembles the chosen plurality of components into a product, and tests the assembled product;
the machine learning system includes:

a state observer for observing a test result of the product and the inventory amounts of the plurality of components grouped based on the characteristic values of the components;

a reward calculator for calculating a reward based on the test result and the inventory amounts;

an artificial intelligence for determining an action value based on an observation result by the state observer and the reward calculated by the reward calculator; and a decision maker for choosing a plurality of components to be used in the next product assembly from the plurality of component groups based on a determination result by the artificial intelligence, wherein the assembly and test unit is configured to assemble a next product from the plurality of components chosen by the decision maker.

2. The production equipment according to claim 1, wherein the reward calculator calculates a higher reward as the performance of the product, as the test result, is closer to a target level, and calculates a lower reward as the difference in the inventory amounts of the components grouped based on the characteristic values of the components is increased.

3. The production equipment according to claim 1, wherein the artificial intelligence determines the action value based on an observation result by a state observer and a reward calculated by a reward calculator of other production equipment having an identical configuration to the production equipment.

4. The production equipment according to claim 1, wherein at least part of the products are motor drives; and the plurality of components include at least one of a current sensor and an A/D converter constituting a current detection circuit of the motor drive.

5. The production equipment according to claim 1, wherein the characteristic of the component is an offset voltage; and the test result is an offset value of a current detection circuit of a motor drive.

* * * * *